United States Patent [19]
Gottfried et al.

[11] Patent Number: 5,603,107
[45] Date of Patent: Feb. 11, 1997

[54] SWITCHING SYSTEM FOR DIVERSITY ANTENNA FM RECEIVER

[75] Inventors: Gordon E. Gottfried, Dearborn; Latha Ravi, Farmington Hills; Mark C. Burek, Livonia, all of Mich.

[73] Assignee: Ford Motor Company, Dearborn, Mich.

[21] Appl. No.: 489,190

[22] Filed: Jun. 9, 1995

[51] Int. Cl.⁶ .................................................. H04B 17/02
[52] U.S. Cl. .................. 455/133; 455/226.1; 455/226.2; 455/33.3; 455/277.1; 455/277.2
[58] Field of Search .................. 455/33.3, 67.1, 455/67.3, 133, 134, 136, 226.1, 226.2, 277.1, 277.2, 278.1, 223–231; 375/347, 260

[56] References Cited

U.S. PATENT DOCUMENTS

| | | |
|---|---|---|
| 4,255,816 | 3/1981 | Grunza et al. . |
| 4,370,522 | 1/1983 | Takeda et al. . |
| 4,394,779 | 7/1983 | Hansen . |
| 4,499,606 | 2/1985 | Rambo . |
| 4,584,709 | 4/1986 | Kneisel et al. . |
| 4,633,519 | 12/1986 | Gotoh et al. ............................ 455/134 |
| 4,656,364 | 4/1987 | Yogogawa et al. . |
| 4,726,073 | 2/1988 | Sessink . |
| 4,742,567 | 5/1988 | Ohe et al. . |
| 4,742,568 | 5/1988 | Furuya . |
| 4,811,330 | 3/1989 | Ohe et al. . |
| 4,864,641 | 9/1989 | Nakamura . |
| 4,864,642 | 9/1989 | Ueno et al. . |
| 4,926,498 | 5/1990 | Suzuki et al. . |
| 4,969,207 | 11/1990 | Sakamoto et al. ...................... 455/134 |
| 4,977,615 | 12/1990 | Suzuki et al. ........................ 455/277.2 |

OTHER PUBLICATIONS

"PAC/CDR—14 General Information", Service Manual, 4 pp., 1995.

*Primary Examiner*—Reinhard J. Eisenzopf
*Assistant Examiner*—Gertrude Arthur
*Attorney, Agent, or Firm*—Mark L. Mollon; Roger L. May

[57] ABSTRACT

An FM radiowave receiver includes a diversity antenna system responsive to signal strength and noise levels. The signal strength and noise detectors generate representative signals that are compared with a threshold value for determining the input to a control for the antenna switch alternately connecting two or more antennas to the front end of the FM receiver. The present invention provides an adaptive threshold for each of the signal strength and noise signals so that the switching is limited to significant changes in signal strength and noise levels. In the preferred embodiment, the noise level threshold is adapted as a function of the modulation level of the audio composite signal delivered from the FM detector to the FM stereo decoder of the receiver.

14 Claims, 4 Drawing Sheets

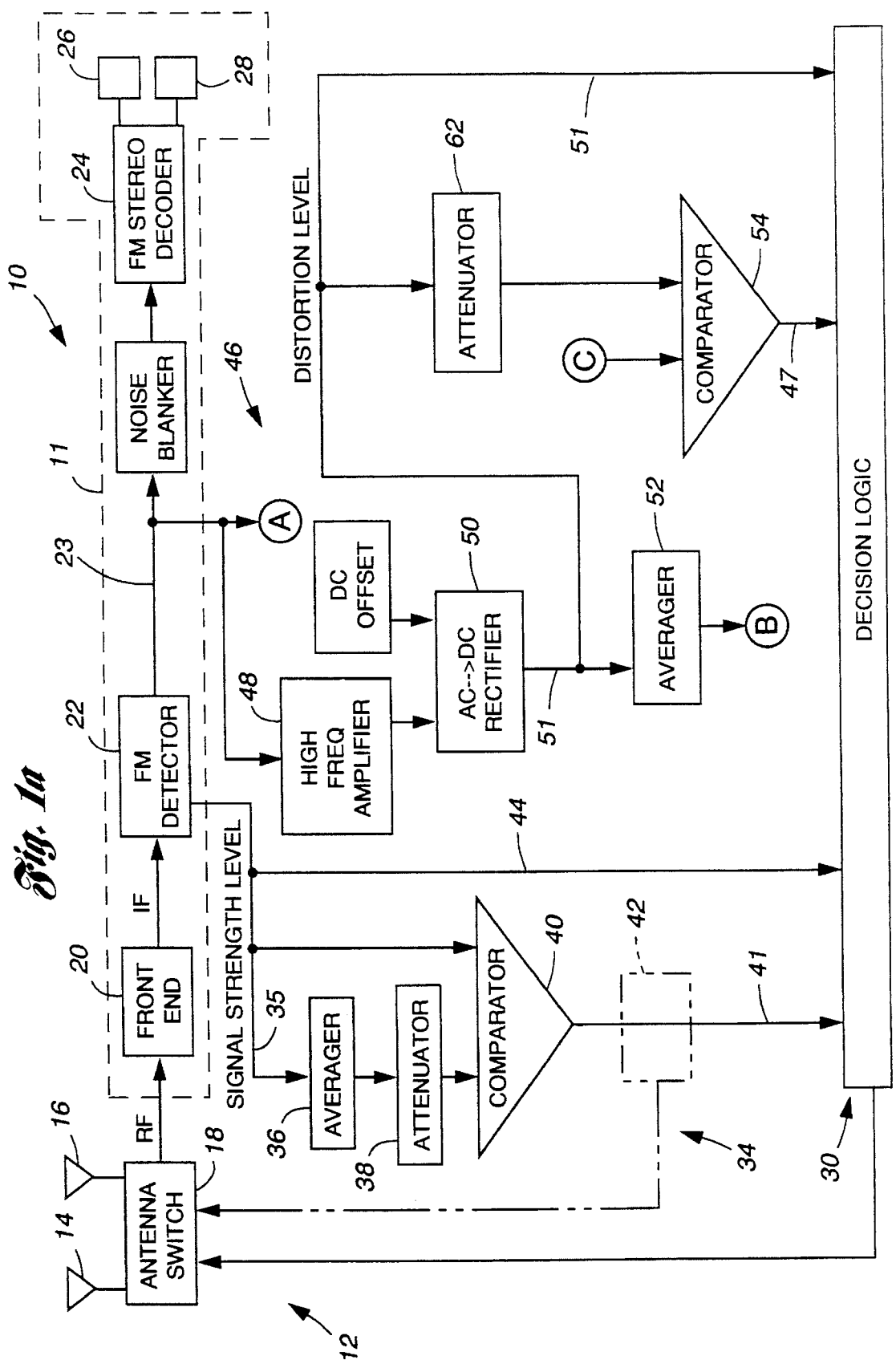

1

SWITCHING SYSTEM FOR DIVERSITY ANTENNA FM RECEIVER

TECHNICAL FIELD

The present invention relates generally to an FM signal receiver with an antenna switch for switching between a plurality of antennas in response to a detector for signal strength or distortion and, more particularly, to such a system that employs an adaptive threshold for signaling an interrupt output from the detector.

BACKGROUND ART

In a typical broadcast environment, a radio signal leaving the transmitter may arrive at the receiving antenna via multiple paths due to reflections from surfaces that do not absorb the frequencies being transmitted, such as buildings, hills, etc. Since the multiple signals at the receiving antenna travel different distances, they can be out of phase with respect to each other, and thus may combine both subtractively and additively. The result is fluctuating signal strength, distortion and noise. This signal corruption is typically called multipath interference.

One way to avoid signal corruption due to multipath interference is to employ spaced apart antennas in a diversity system. The spaced antenna diversity system employs two or more antennas spaced at least one-quarter wavelength apart. When a selected antenna enters a multipath null, a location at which signals cancel each other as they combine at the antenna, a diversity circuit detects the null and switches the receiver to another antenna. On the premise that, in most cases, the other antenna will not be positioned in the multipath null, the noise including interference and distortion that would otherwise be heard by the listener may be reduced.

Typically, a diversity circuit will respond to a drop in the signal strength as represented by a DC voltage signal developed by the FM detector. A decision section of the circuit compares an instantaneous signal strength voltage signal to an attenuated average signal strength voltage signal. The circuit may also include a weak signal comparator to prevent switching to a less sensitive antenna when a weak signal is being received to avoid complete loss of the signal.

A control section of a circuit returns the receiver to the original antenna when the newly selected antenna is of equal or less strength than the original antenna. Such a section often includes control to disable the diversity circuit when the radio is in the tune, seek or scan mode of operation. An antenna switching section of the circuit includes transistor switches which bias PIN diodes that alternatively connect the antennas to the FM front end. The control section can be conveniently implemented by integrated circuits (ICs) as is the decision section of the diversity antenna circuit.

The previously known diversity circuits often employed a switching strategy that involved comparison of the received signal strength or quality to a predetermined threshold. However, thresholds which cannot be changed according to the environmental needs may induce excessive switching or insufficient switching depending upon the broadcast environment in the area. In addition, other FM diversity strategies employ two tuners in the structure which substantially increases the equipment, size and expense of operating the diversity antenna system.

When multiple signals of the same source combine subtractively at the receiving antenna, a sudden drop occurs in the signal strength level. If a receiving antenna is moving, as is common with radios in motor vehicles, a drop in signal strength is usually of short duration since it lasts only as long as it takes the antenna to pass through the null. However, antenna switches responsive to the drop in signal level may contribute to excessive switching and unnecessary switching to an antenna providing a signal of less quality before switching back to the better performing antenna for that broadcast environment. Such interruptions adversely affecting the sound quality perceived by the listener, and may be more annoying than the loss of signal strength.

SUMMARY OF THE INVENTION

The present invention overcomes the above-mentioned disadvantages by providing a diversity antenna switching circuit using a comparator with an adaptive threshold determined as a function of past signal performance. The present invention utilizes either an audio composite signal or signal strength level outputs, but preferably both, that can be conveniently implemented as found on commercially available FM detector ICs, with a control logic to control antenna switching.

In the preferred embodiment, a first signal strength interrupt is preferably developed when the instantaneous value is compared with an averaged value of past antenna signal strength that provides a first signal strength adaptive threshold for operating the antenna switch. In addition, a distortion signal is preferably generated from the audio composite and also compared with an average or historical reference of distortion in order to provide another indication of the need for controlling the antenna switch. Preferably, the averaged values of the signal strength and distortion signals are attenuated or offset in order to assure that only multipath events significantly greater than average will produce an interrupt for the decision logic control circuit.

In the preferred embodiment, the signal strength detector of the diversity antenna system averages the signal strength level determined from the FM detector to provide the history of the current antenna's strength, if no switching has occurred. If switching has occurred during the time of recorded history, it provides a history of both antennae strength. The average output is also attenuated before being compared to the instantaneous signal strength. Thus, the comparator only outputs an interrupt when a significant and short duration drop in signal level has occurred due to the subtractive combining of multipath signals. The history function provided by this invention isolates the decision logic from interrupts when history suggests that no stronger alternative antenna is available.

In this disclosure of the specification and claims, references to noise and distortion are interchangeable as detectors for either or both may be employed to control diversity. In the preferred embodiment, the distortion detector of the diversity antenna system uses the audio composite signal, which is an AC signal that contains the baseband L+R, the stereo pilot, and the L–R subcarrier of a stereo broadcast signal, and may also contain other special purpose subcarriers, all of which are below 75 KHz. The audio composite output, however, typically has a bandwidth much wider than 75 KHz. When the audio composite signal is distorted, frequencies above 75 KHz are produced. The diversity antenna system of the present invention amplifies only frequencies above 75 KHz, and then rectifies those frequencies to obtain a DC distortion level voltage which increases as the amount of distortion increases. An attenuated version of the distortion level feeds one input of a voltage comparator while a time averaged distortion level signal providing a history of past distortion levels, is fed to the other input of the comparator.

If no distortion has occurred for a time interval greater than the history recorded by the averager, both the attenuated distortion level and the time averaged level would be zero. As a result, the comparator output would dither randomly. Therefore, the preferred embodiment includes a DC offset to bias the output of the rectifier so that the comparator responds only when a burst of distortion that is significantly greater than the history of distortion occurs. This attenuated instant to average comparison also isolates the decision logic from an overload of interrupts when the reception environment is very poor with respect to multipath distortion, since only multipath events that are significantly greater than average will produce an interrupt.

A preferred option for adapting the threshold of distortion necessary to trigger the antenna switch are provided by using a modulation detector. Program material that is broadcast using a high index of modulation typically produces more distortion in the receiver, particularly if the program material is rich in high audio frequency content. This same content tends to mask the noise associated with reception of multipath signals. A composite signal is filtered so that only audible frequencies are rectified and averaged, thus producing a DC voltage that increases as modulation increases. This signal is summed with the average distortion level so that a higher burst of distortion is required to switch the comparator's output as the modulation increases.

Preferably, the comparator outputs are provided as interrupts to a decision logic circuit. Since interrupts have been minimized, for example by use of the signal history comparisons or modulation level biasing, the logic processing overhead is kept to a manageable level. When an interrupt is received, a preferred form of decision logic measures and records the distortion level of the current antenna at an analog-to-digital input. Immediately after the switch is commanded to connect an alternative antenna, the decision logic waits for the signal to stabilize, then measures its distortion level. A comparison of distortion levels is made and the alternative antenna is abandoned if it is not an improvement. The switching and comparing may continue an arbitrary number of times until an improvement is found, or until the decision logic decides to give up for a preselected time interval. The time required to decide on an antenna is a small fraction of the time a noticeable multipath noise endures, so that audio quality to the ears of the listener is improved.

Preferably, both the signal strength interrupt and the distortion interrupt subsystems are employed together with the decision logic. Although the signal strength interrupt subsystem is relatively simple, fast, and low-noise, it has the disadvantages that the circuit saturates at high signal strengths, does not respond to additive multipath, noise does not always accompany a drop in the signal strength, and requires all antennae to have similar efficiency. Furthermore, while the distortion interrupt circuit has the advantages that it is responsive to subtractive and additive multipath, and it is not very dependent on the relative antenna efficiency, it has substantially higher complexity, longer propagation delay, it is more sensitive to audio modulation, and it is noisy when signals are weak. The decision logic uses the average signal strength and/or average distortion levels provided it, to choose which interrupts to rely on based on the above characteristics of each subsystem. The decision logic also has the provision to force the antenna of higher efficiency to be selected in a very weak signal environment where switching to an antenna of lesser efficiency would cause the receiver's FM detector to drop out of limiting. The appropriate antenna is also forced by the decision logic during operations such as station seek, where consistent signal criteria need be met.

In summary, the present invention provides a diversity antenna system with adaptive signal strength threshold in which the signal strength must drop significantly relative to previous performance to indicate to the decision logic circuit that an alternative antenna may improve reception. The threshold is derived from historical antenna performance to minimize the switching interrupts to the decision logic. Similarly, the present invention provides a diversity antenna system in which an adaptive distortion level threshold is derived from the average of past distortion levels. In addition, the distortion level threshold can be made adaptive to the audio modulation level to compensate for the increased distortion and noise masking effects of high modulation. The combined performance of signal strength and distortion level interrupts provides more comprehensive response to multipath distortion and results in improved audio fidelity.

BRIEF DESCRIPTION OF THE DRAWING

The present invention will be more clearly understood by reference to the following detailed description of a preferred embodiment in which like reference characters refer to like parts throughout the views and in which:

FIGS. 1a and 1b are schematic representations of an FM receiver system including a diversity antenna circuit.

DETAILED DESCRIPTION OF A PREFERRED EMBODIMENT

Figure 1B:
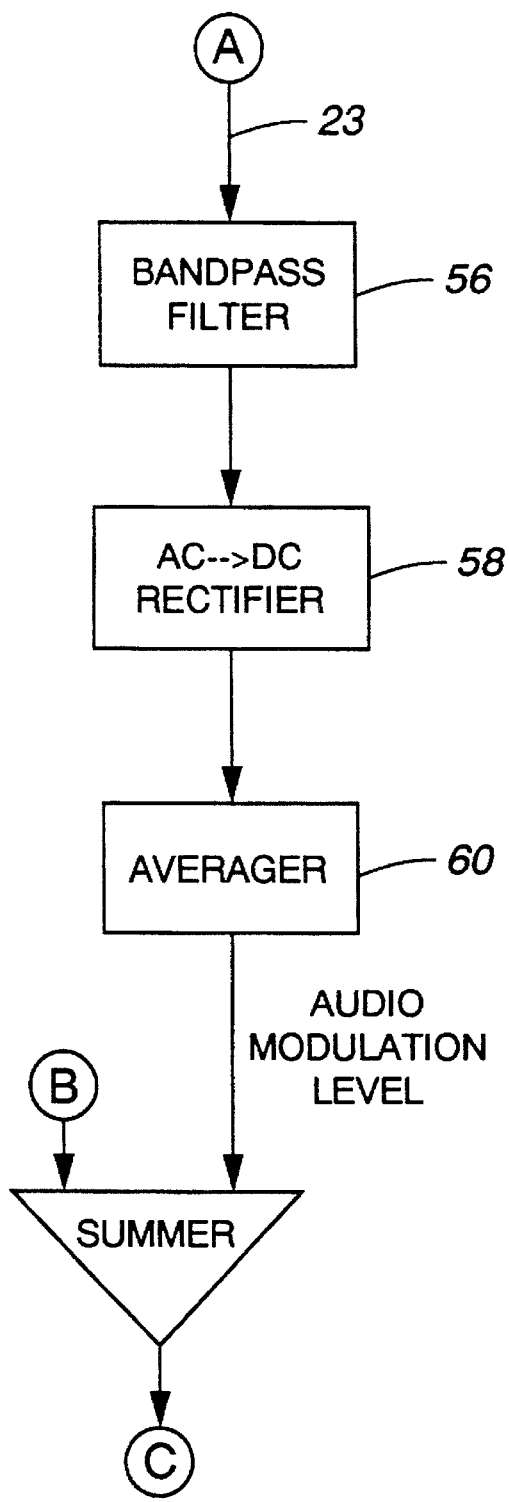

Referring first to FIG. 1, an FM receiver system 10 comprises a diversity antenna system 12 employing at least two antennas 16 and 14. The antennas are coupled through an antenna switch 18 to couple the RF signal to the front end 20 of the receiver system 10. In a well known manner, the front end 20 provides an intermediate frequency signal to the FM detector 22 that provides a multiplex signal to the FM stereo decoder 24. The stereo decoder 24 in turn produces right and left audio outputs for delivery to the audio processor, then amplifiers, and finally the speakers, as shown diagrammatically at 26 and 28.

The FM detector 22 may be of a well known type, for example, an IC which provides an AC audio composite signal as well as a signal strength detector that generates a DC voltage that increases as radio frequency (RF) signal strength increases. For example, some well known commercially available FM detector ICs provide such signals, and can be employed in the diversity antenna circuit 12 as described below.

Antenna switch 18 coupling one of the antennas 14 and 16 to the front end of the receiver, receives a switch control signal from a decision logic circuit 30. In the preferred embodiment, the decision logic circuit 30 comprises a programmed microprocessor, although it is to be understood that hardware logic circuits and other alternatives can be employed to practice the present invention. Likewise, the adaptive threshold circuits formed as part of the diversity antenna system 12 are preferably formed with discrete analog circuitry, although other digital circuitry and other alternatives are also available for use in practicing the present invention.

A signal strength control signal branch 34 includes an input from the signal strength output 35 of the FM detector IC that is introduced to an averager 36. The output of the averager 36 is delivered to an attenuator 38 so that the signal can be reduced before introduction to the comparator 40. The DC strength level signal 35 is fed into the other input of the comparator 40 to provide a signaling output for operation of the antenna switch 18. The output from the comparator 40 introduced in the prior art to a hardwired switch control as shown at 42 in phantom line in FIG. 1, is now fed directly into the decision logic circuit 30 for use in conjunction with the signal strength voltage signal as shown at branch 44 in FIG. 1.

In addition, the AC audio composite signal 23 is input to a branch 46 that delivers the audio composite signal 23 to a high frequency amplifier so that only signals above 75 KHz, which are indicative of distortion, will provide an input to the antenna switch control. The output of the amplifier 48 is rectified to form a DC voltage to create a distortion level signal 51. The output 51 of the rectifier 50 is then delivered to an averager 52 so that the past performance indicated by average distortion level output B can be input at C and compared at comparator 54 with the distortion level DC signal 51. Preferably, the distortion level 51 is attenuated in attenuator 62 to limit the interrupt signal output from the comparator 54 to only instances of substantially increased distortion.

The operation of the distortion level branch 46 of the diversity control can be enhanced by adapting the distortion interrupt signal to the audio modulation level as shown at FIG. 1b. As shown, the audio composite signal 23 is input to a bandpass filter 56. The filtered signal is rectified as shown at 58 and input to an averager 60 that outputs a representation of the audio modulation level on the audio composite signal. The output of the averager 60 is then summed with the output of the averager 52 as shown at B to provide the first input to the comparator 54 as shown at C. Moreover, the DC distortion level signal 51 introduced to the attenuator 62 is also fed into the decision logic circuit 30, and is averaged as shown at 64 so that output 49 may be used in managing interrupts.

Figure 2A:
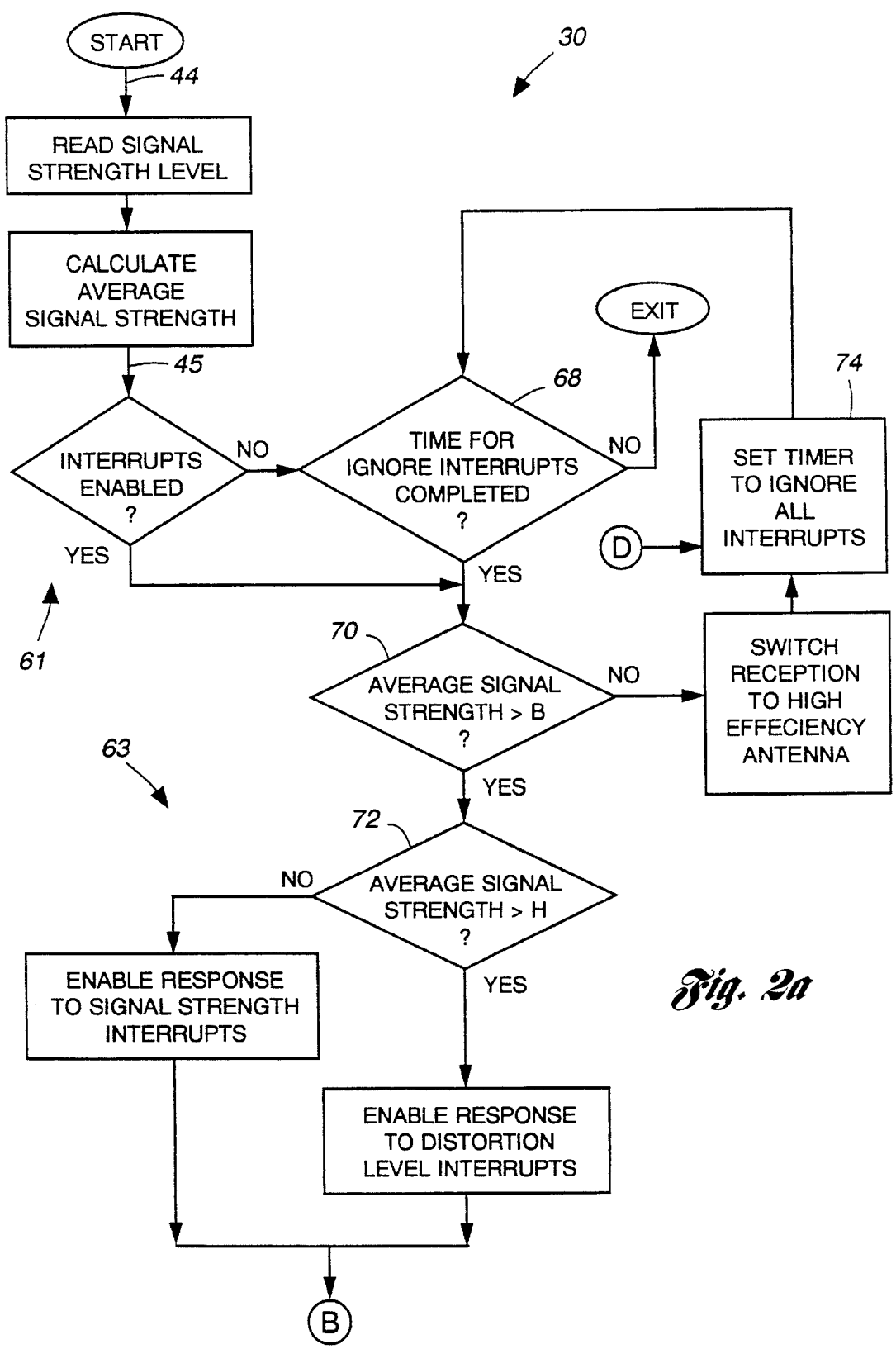
FIGS. 2a and 2b are representations of the decision logic processing employed in the diversity antenna circuit of the system shown in FIG. 1.

Referring to FIG. 2a, decision logic 30 includes a signal strength monitor 61. The monitor 61 initiates the conditions that the interrupts are disabled and the timer for ignoring interrupts is set to zero. The monitor 61 receives the signal 43 representing signal strength level. The average may be a simple time average or more sophisticated averagers may be used. If the interrupts are enabled, the decision logic proceeds to manage the interrupt as discussed below with respect to FIG. 2b. If the interrupts are not enabled, the logic determines whether the timer set for ignoring the interrupts has completed a period duration, the duration being a time shorter than the time occurring between discreet multipath events. Preferably, the timer to ignore interrupts counts periods on the order of milliseconds.

Still referring now to FIG. 2a, the decision logic 30 also chooses the interrupt type needed by determining the level of the average signal strength or average distortion level as shown at 63 at which the logic 30 is enabled to respond. For example, the signal strength may be compared with two thresholds of signal strength level as shown at 70 and 72 in FIG. 2a. If the average signal strength is greater than B but less than H, the decision logic may enable responses to the signal strength interrupts generated at 41. If the average signal strength is greater than both threshold levels B and H, the decision logic enables response to the distortion level interrupt at 47. When the average signal strength is less than the lower threshold, the decision logic directs the antenna switch 18 to be switched to the higher efficiency antenna, an appropriate response to reception of a very weak signal. The decision logic 30 then sets a timer to ignore all interrupts as shown at 74 for a predetermined time period for ignoring interrupts. Thus, when the time for ignoring interrupts has not expired, the exit as shown at 68 in FIG. 2 permits other processing to be performed when one time for ignoring interrupts remains active. The logic loop is repeated periodically.

Alternatively, the choice of interrupts can include a determination based on the distortion as designated at 51 (FIG. 1).

Figure 2B:
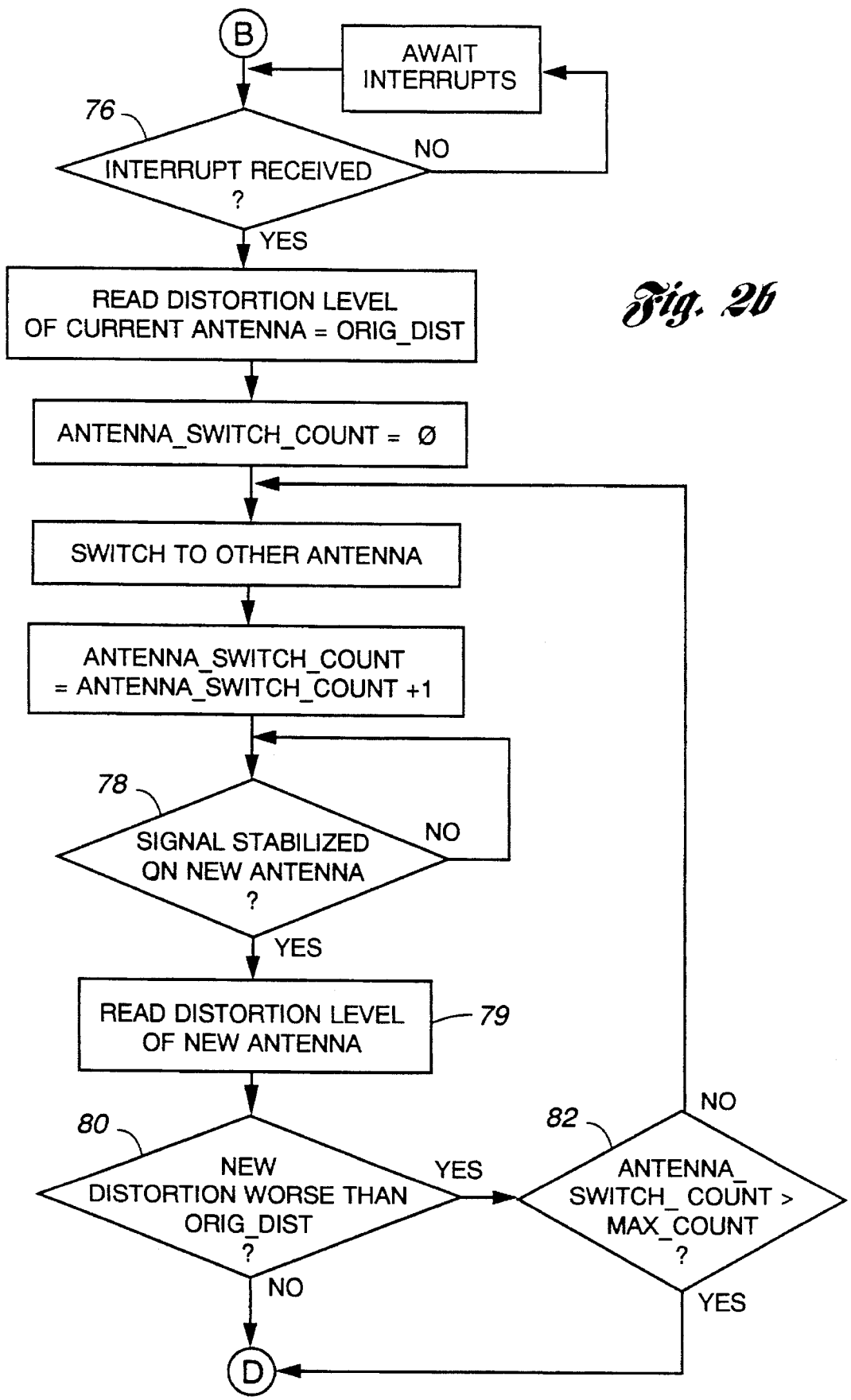

Referring now to FIG. 2b, when the interrupts have been enabled, the decision logic 30 manages the interrupt to control the operation of the antenna switch 18. If an interrupt has been received that denotes a significant change in signal strength or distortion level, the decision logic measures the distortion level of the current antenna. The antenna switch count is set to zero and the switch is made to the other antenna.

The antenna switch count is then incremented to the antenna switch count plus one after switching and a determination is made at 78 whether the signal is stabilized on the new antenna. The time for signal to stabilize is governed by the propagation delay of tuner and distortion level circuit, and is preferably on the order of microseconds. The decision logic waits for stabilization of the signal at the antenna. When the signal is stabilized for example, by operation of a settling timer preset for a predetermined time, the decision logic 30 measures the distortion level of the new antenna, then compares the new distortion to the original distortion as shown at 80. If a new distortion is higher than a preselected level above the original distortion, the antenna switch count is compared with the predetermined maximum count. When the antenna switch count exceeds the predetermined maximum count, as shown as 82, the decision logic disables the response to interrupts and sets the ignore interrupts timer.

Alternatively, if the antenna switch count is not greater than the predetermined maximum count, the decision logic switches to the other antenna, the antenna switch count is set equal to the antenna switch count plus one, the logic determines whether the signal is stabilized on the antenna as at 78, and distortion levels are again compared. The predetermined maximum switching count at 82 is based on the characteristics of the system. If the distortion level of the new antenna is less than a preselected level above the original distortion the decision logic allows continued reception using the new antenna until the ignore interrupts timer expires after which the decision logic enables and waits for the appropriate interrupt.

Having thus described the present invention, many modifications thereto will become apparent to those skilled in the art to which it pertains without departing from the scope and spirit of the present invention as defined in the appended claims.

What is claimed is:

1. An FM receiver having a plurality of antennas, an FM signal detector generating a strength signal indicating a level of radiowave voltage, and a noise detector generating a noise signal indicating the level of noise, and a switching circuit including a logic control for selecting one of said plurality of antennas in response to the strength signal or the noise signal reaching a threshold level;

wherein said logic control further comprises an adapter for revising said threshold level, said adapter comprising at least one of a first interrupt generator and a second interrupt generator, said first interrupt generator being responsive to a significant short duration drop in signal level, and said second interrupt generator being responsive to a significant short duration increase in noise.

2. The invention as defined in claim 1 wherein said significant short duration drop in signal level comprises a predetermined ratio of instant signal level to average signal level.

3. The invention as defined in claim 2 wherein said significant signal drop comprises a predetermined ratio of instant signal level to attenuated average signal level.

4. The invention as defined in claim 1 wherein said significant short duration increase in noise comprises a predetermined ratio of instant noise level to average noise level.

5. The invention as defined in claim 4 wherein said significant short duration increase in noise comprises a predetermined ratio of attenuated instant noise level to average noise level.

6. The invention as defined in claim 1 wherein said logic control comprises a signal strength monitor including an ignore interrupt circuit with an ignore interrupt timer for setting a predetermined time to ignore interrupts in response to a signal at said threshold level.

7. The invention as defined in claim 1 wherein said switching means comprises a logic circuit having an interrupt selector selecting at least one of said first interrupt generator and second interrupt generator upon detection of a first threshold level and selecting at least one of said first and second interrupt generator in response to a second threshold level.

8. The invention defined in claim 1 wherein said switching circuit comprises a logic circuit having an interrupt manager for activating said switching means to the alternative antenna when said received signal has a noise level greater than the current antenna level plus or minus a predetermined threshold level.

9. The invention defined in claim 8 wherein said interrupt manager includes a switch count for determining when a predetermined number of antenna switches have occurred.

10. The invention defined in claim 1 wherein said adapter comprises a modulation detector for generating a representative signal corresponding to the index of modulation.

11. The invention as defined in claim 1 wherein said logic control includes an ignore interrupt timer responsive to detection of said threshold level signal to set a predetermined time for disabling interrupts for a predetermined time.

12. The invention as defined in claim 1 wherein said logic control comprises a forcer to select the antenna of higher efficiency when said threshold is below a predetermined level.

13. An FM receiver having first and second antennas, an FM signal detector generating a strength signal indicating a level of radiowave voltage, a noise detector generating a distortion signal indicating the level of high frequency signal, and a switching circuit for selecting one of said first and second antennas in response to a strength signal or said distortion level reaching a threshold level;

wherein said receiver further comprises a logic control including an adapter for revising said threshold level, said adapter comprising at least one of a first interrupt generator and a second interrupt generator, said first interrupt generator being responsive to a predetermined ratio level of instant signal level to average signal level, and said second interrupt generator being responsive to a predetermined ratio of an instant distortion level to average distortion level;

wherein said logic circuit includes an interrupt selector selecting at least one of said first interrupt generator and said second interrupt generator upon detection of a first threshold level and responding to both said first and second interrupt generators in response to a second threshold level.

14. A method for controlling an FM receiver with a decision logic controller and having first and second antennas, an FM signal detector generating a strength signal indicating a level of radiowave voltage, a distortion detector generating a signal indicating the level of high frequency signal, and a switching circuit including a logic control for selecting one of said first and second antennas in response to a strength signal or said distortion level reaching a threshold level; the method comprising adapting said threshold level with at least one interrupt generator by using a first interrupt generator determining compliance with a predetermined ratio level of instant signal level to average signal level, or determining compliance with a second predetermined ratio of an instant distortion level to average distortion level;

actuating said switching means upon compliance; and ignoring interrupts for a predetermined time after compliance.

* * * * *